Patented July 29, 1952

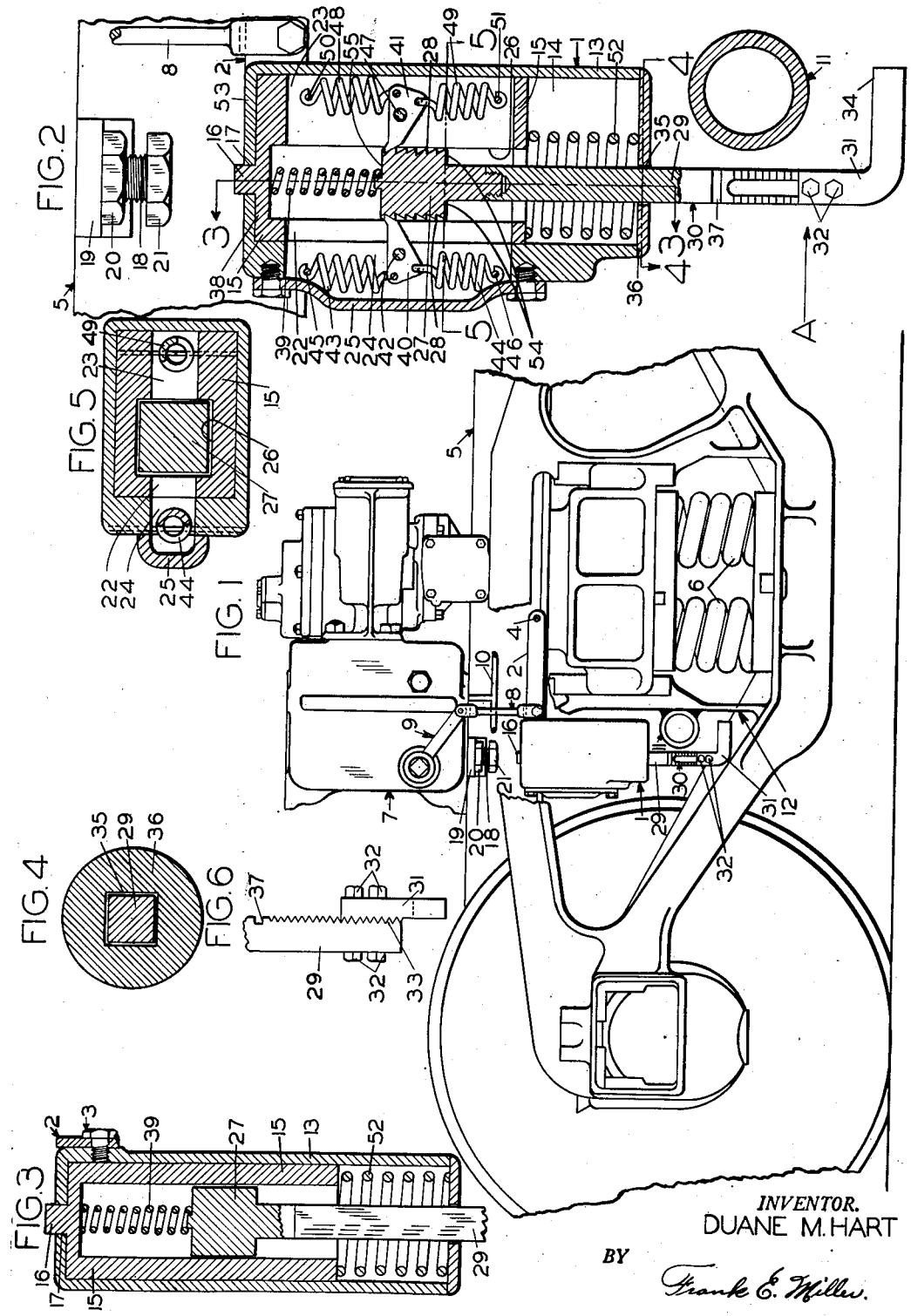

2,605,145

UNITED STATES PATENT OFFICE 2,605,145

ADJUSTING MECHANISM FOR LOAD COMPENSATING BRAKE APPARATUS

Duane M. Hart, Pittsburgh, Pa., assignor to Westinghouse Air Brake Company, a corporation of Pennsylvania Application July 26, 1949, Serial No. 106,823

11 Claims. (Cl. 303—22)

1

This invention relates to fluid pressure brakes and more particularly to the compensating type for varying the degree of brake application on a car in substantial proportion to the load carried by the car.

In the copending application, Serial No. 736,010 of Earle S. Cook, et al., filed March 20, 1947, now Patent No. 2,482,246 issued September 20, 1949 and assigned to the assignee of this application, there is disclosed a load compensating fluid pressure brake apparatus including measuring means arranged to cooperate with an unsprung part of a car for adjusting said apparatus to limit the degree of brake application on the car in accordance with the deflection of the car springs and hence in substantial proportion to the load on the car. When the brake apparatus is initially installed on the car the measuring means is properly adjusted for a fully loaded car to accomplish this result. After a car is placed in service however, there is a tendency for the load carrying springs to gradually shorten, for any chosen load carried thereby, to a so-called "permanent set" condition, resulting in a gradually decreasing deflection of the car springs for any change in load on the car, so that the measuring means, as initially adjusted for the new car with new springs, will not accurately adjust the brake apparatus to the degree of load on the car after the car has been in use.

The principal object of the invention is therefore the provision of means for automatically compensating for a change in deflection characteristic of car springs, such as above mentioned, so as to provide substantially the same adjustment of the compensating brake apparatus for a fully loaded cart throughout the change in spring deflection characteristic, as when the springs are new.

Other objects and advantages will be apparent from the following more detailed description of the invention.

In the accompanying drawing; Fig. 1 is a partial, side view of a truck of a railway car equipped with a load compensating fluid pressure brake apparatus having a measuring arm embodying the invention; Fig. 2 is a vertical, sectional view, mainly in section, of the measuring arm shown in Fig. 1; Fig. 3 is a sectional view of said measuring arm taken on the line 3—3 in Fig. 2; Fig. 4 is a sectional view of said measuring arm taken on the line 4—4 in Fig. 2; Fig. 5 is a sectional view of said measuring arm taken on the line 5—5 in Fig. 2; and Fig. 6 is a view of a portion of the measuring arm looking in the direction of arrow "A" in Fig. 2.

Description

As shown in the drawing, the reference numeral 1 designates an adjusting means or measuring arm, embodying the invention, for a load compensating brake apparatus, such as disclosed in the above mentioned copending application, said arm being pivotally connected to one end of an operating lever 2 by a bolt 3 (Fig. 3). The lever 2 is suitably fulcrumed at its other end on a pin 4 carried by a car center sill 5 or some other sprung part of the car which is supported by the usual truck springs 6. Lever 2 is connected intermediate its ends to a load compensating valve device 7 by means of a link 8 and a crank arm 9. The load compensating valve device 7 is suitably mounted upon center sill 5 in the usual manner by any suitable means (not shown). The load compensating valve device 7 may be the same as that fully disclosed and described in the above mentioned copending application, and adapted to operate during initial charging of a brake pipe 10 from atmospheric pressure to a certain chosen higher pressure to move the measuring arm 1 into engagement with an unsprung part of the car truck, such as a measuring element 11 which is welded or otherwise suitably fastened to an unsprung truck frame 12, for adjusting said valve device in accordance with the deflection of springs 6, and hence in accordance with the load on the car, for limiting the degree of a brake application correspondingly.

In the drawing, the load compensating valve device 7 is merely shown in outline since it forms no part of the present invention and reference may be had to the above mentioned copending application for details of construction and operation thereof.

Considering the parts of the measuring arm 1 in detail, as shown in Fig. 2, said arm comprises a body 13 having a chamber 14 which is preferably rectangular in cross-section. Slidably mounted in chamber 14 is a plunger 15, the outside contour of which conforms to the rectangular shape of chamber 14. Plunger 15 is provided with a stem 16 normally extending through a round bore 17 in body 13 a certain chosen distance, the end of said stem being spaced from an adjustable stop in the form of a cap screw 18 having screw-threaded engagement with a bracket 19 which may be welded or otherwise fastened to center sill 5. A lock nut 20 is provided on cap screw 18 for engagement with bracket 19 to lock said cap screw in any one of a plurality of positions relative to said bracket 19 to adjust the distance between the adjacent end of stem 16 and a head 21 of said cap screw.

Plunger 15 is also provided with two cavities or spring chambers 22 and 23, cavity 22 being coextensive with a cavity 24 formed in body 13, said cavity 24 being closed by a cover 25 to exclude dirt and water. Plunger 15 is further provided with a square bore 26 in which is slidably disposed a vertically arranged square rack 27 provided with two rows of teeth 28 arranged opposite to each other on said rack.

The design of teeth 28 is such that the distance from any point on one tooth to the corresponding point on the adjacent tooth is equal to the distance that stem 16 normally projects beyond the top of body 13. The purpose of making these distances equal will be explained hereinafter in greater detail. The lower end of rack 27 is reduced in cross-sectional area and provided with screw-threads for screw-threaded engagement with an upper threaded portion 29 of a measuring leg 30. Measuring leg 30 comprises in addition to portion 29, a contact foot or hook 31 adjustably but rigidly secured to threaded portion 29 by means of bolts 32. By reason of a slot in threaded portion 29 through which the bolts 32 extend and complementary serrated faces of threaded portion 29 and foot 31, which faces are indicated at 33, the overall length of measuring leg 30 may be varied as desired by adjusting the position of foot 31 relative to portion 29 with bolts 32 loosened and then tightening said bolts. Foot 31 is provided on its upper side with a surface 34 for contact with the lowermost part of unsprung measuring element 11 in a manner explained more fully hereinafter.

Above the serrated face of threaded portion 29 said portion is preferably square in cross-section (Fig. 4), and passes through a square bore 35 in a cap 36 which closes the lower end of chamber 14, said cap being fastened to body 13 by any suitable means (not shown). The threaded portion 29 of leg 30 is provided with a slot 37 located a distance below the bottom surface of cap 36 equal to the length of the toothed portion of rack 27.

The upper end of the square bore 26 is closed by a wall 38 constituting a part of plunger 15. A spring 39 supported by rack 27 bears against wall 38 for urging said rack in a direction away from wall 38.

Two identical but oppositely arranged pawls 40 and 41 are provided, each for engaging one of the two rows of teeth 28 on rack 27. Pawl 40 is pivoted in cavity 24 on a pin 42, carried by body 13. Two springs 43 and 44 are opposingly connected to pawl 40 at the same side of its pivot, said springs having the same change in pressure per unit deflection characteristics, said characteristics being greater than the corresponding characteristic of spring 39. Springs 43 and 44 are anchored on pins 45 and 46 respectively, carried by body 13.

Pawl 41 is pivoted in cavity 23 on a pin 47 carried by plunger 15. Two springs 48 and 49 are opposingly connected to pawl 41 at the same side of its pivot, said springs having the same change in pressure per unit deflection characteristics as springs 43, 44. Springs 48 and 49 are anchored on pins 50 and 51 respectively, carried by plunger 15.

Disposed in chamber 14 between cap 36 and plunger 15 is a spring 52 for urging said plunger in the direction of a stop 53 constituting the top wall of body 13.

*Operation*

At the time the measuring arm 1 is assembled, the pawls 40 and 41 are positioned to engage respectively, the top most teeth of the two rows of teeth 28 in which position they are shown in Fig. 2 of the drawing. At the same time contact foot 31 is fastened to the lower end of the serrated face of threaded portion 29 by means of bolts 32 as also shown in Fig. 2. With measuring arm 1 thus assembled, it, together with cap screw or adjustable stop 18, bracket 19 and lock nut 20 are installed on a railway car in the position in which they are shown in Fig. 1 of the drawing. When measuring arm 1, adjustable stop 18, bracket 19, and lock nut 20 are thus installed on a car, said adjustable stop is adjusted with respect to said bracket until the distance between the undersurface of said stop and the top surface of stem 16 is equal to the distance between surface 34 of contact foot 31 and the lowermost undersurface of measuring element 11 when the car is fully loaded. With adjustable stop 18 in this adjusted position, lock nut 20 is locked against the under surface of bracket 19 to lock said stop in its adjusted position. The load compensating valve device 7 and measuring arm 1 are now conditioned to effect a load measuring operation.

With no fluid under pressure present in brake pipe 10, and with the car fully loaded and having new springs, the various parts of the brake apparatus will occupy the position in which they are shown in Fig. 1 of the drawing. To condition the equipment for operation, fluid under pressure is supplied to brake pipe 10 in the usual manner. When the pressure of fluid in brake pipe 10 is increased to the certain chosen pressure, during initial charging of the brake pipe, crank arm 9 will be rocked in a counter-clockwise direction by fluid under pressure supplied to the load compensating valve device 7 and pull link 8 and operating lever 2 in an upward direction, said lever rocking about its pivot pin 4. This movement of operating lever 2 will in turn lift measuring arm 1 upward, said arm rocking, due to its own weight, relative to said lever about its pivotal connection therewith, and thereby remaining in a vertical position. Measuring arm 1 will be lifted vertically to bring the top surface of stem 16 into engagement with the bottom surface of head 21 and surface 34 of leg 30 into engagement with the lowermost part of unsprung measuring element 11, the two engagements occurring simultaneously with the car fully loaded since the distances between the top of stem 16 and head 21, and top surface 34 and measuring element 11, were adjusted to be equal when the equipment was installed on the car as previously explained. Upon surface 34 engaging the lowermost part of unsprung measuring element 11, further upward movement of measuring arm 1 will be arrested and the load compensating valve device 7 will be conditioned in a manner fully described in the above mentioned copending application to provide for the proper braking force on the fully loaded car.

Now let it be assumed that after the car has been in service the truck springs 6 have shortened permitting the car center sill 5 to assume a vertical position closer to truck frame 12 than permitted when said springs were new, for any chosen degree of load on the car. As a result of the shortening of springs 6, measuring arm 30 also will be in a lower position than when springs 6 were new, with a greater distance between surface 34 of contact foot 30 and the lowermost part of unsprung measuring element 11, but the distance between the top of stem 16 and the bottom of head 21 of adjustable stop 18 is the same as when springs 6 were new since said stem and stop are both carried by the sprung center sill 5.

With springs 6 thus shortened, upon initially charging the brake pipe 10 on a fully loaded car, the crank 9 will be rocked, as before described, in a counter-clockwise direction for lifting measuring arm 1 upward. As measuring arm 1 is thus lifted upward, stem 16 will engage the head 21 of adjustable stop 18 prior to surface 34 of contact foot 31 engaging the lowermost part of the unsprung measuring element 11. When the top of stem 16 engages the bottom of head 21, further movement of plunger 15 is prevented. However, since surface 34 of contact foot 31 has not yet engaged the lowermost part of measuring element 11, continued counter-clockwise rocking of crank arm 9 is permitted which will thereby lift body 13 and measuring leg 30 upward relative to plunger 15 against the force of the spring 52 until the top of body 13 engages head 21, the leg 30 being lifted with the body 13 at this time due to the engagement between pawl 40 carried by body 13 and one tooth of the rack 27. As the rack 27 is thus moved upward relative to plunger 15 as just described, pawl 41, which is pivoted on pin 47 carried by plunger 15, will be ratcheted over one tooth of the right hand row of teeth 28. The ratcheting of pawl 41 with respect to the right hand row of teeth 28 is limited to one tooth by reason of the fact that, as hereinbefore explained, stem 16 projects from body 1 a distance equal to the distance between two teeth. Therefore, when body 13 and leg 30 of measuring arm 1 have been lifted relative to plunger 15 a distance equal to the distance between two adjacent teeth, the top of stem 16 will be flush with the top of body 13 and both will engage head 21 of adjustable stop 18. The engagement of the top of body 13 with head 21 will prevent further upward movement of measuring arm 1.

If springs 6 have not shortened more than the distance between two adjacent teeth 28, surface 34 of contact foot 31 will engage the lowermost part of measuring element 11 at substantially the same time as the top of body 13 engages head 21 of adjustable stop 18. Actual experience with truck springs has demonstrated that the shortening of the springs due to permanent set occurs at a very slow rate and there is little likelihood that the amount of shortening of springs 6 occurring during the time interval between two successive load measuring operations on a fully loaded car will exceed the distance between two teeth 28.

With the top of body 13 in engagement with head 21 of adjustable stop 18, further counter-clockwise rocking of crank arm 9 is prevented, and the load compensating valve device 7 will be conditioned to provide a certain braking force for a fully loaded car in a manner fully explained in the hereinbefore mentioned copending application of Cook, et al. As explained in the Cook application, the load compensating valve device 7 is adapted to be conditioned to provide a braking force for a car in accordance with the distance between a sprung and unsprung part of the car, said distance being proportional to the load on the car. Therefore, if the distance between the top of stem 16 and the bottom of cap screw head 21, with the measuring arm 1 in the position shown in the drawing, be made equal to the distance between surface 34 of foot 31 and the undersurface of measuring element 11 when the springs 6 are new and the car is fully loaded, as has hereinbefore been explained, it is evident that an increase in the distance between the surface 34 of foot 31 and the undersurface of measuring element 11 sufficient to permit crank arm 9 to rock in a counter-clockwise direction until the top of body 13 engages cap screw head 21, will cause the load compensating valve device 7 to be conditioned to provide a braking force for the fully loaded car slightly in excess of the required braking force therefor. This increase in braking force is the same as the increase in braking force caused by an increase in load sufficient to increase the distance between surface 34 of foot 31 and the undersurface of measuring element 11 an amount equal the distance stem 16 projects above the top of body 13 when plunger 15 engages said top as shown in the drawing. Since the distance stem 16 projects above the top of body 13 is comparatively short the overbraking provided for the car will only be slight. Furthermore, this overbraking will occur only during the one brake application when the leg 30 is adjusted, as hereinafter explained, to maintain the distance between surface 34 of foot 31 and the undersurface of measuring element 11 constant for any given load notwithstanding a change in the deflection characteristics of springs 6.

Upon the pressure in brake pipe 10 being raised above the hereinbefore mentioned chosen pressure, the load compensating valve device 7 will operate, in a manner fully described in the above mentioned copending application, to rock crank arm 9 in a clockwise direction and thereby lower measuring arm 1 until said arms 9 and 1 assume the position in which they are shown in Fig. 1 of the drawing.

Upon body 13 beginning its descent from the position in which the top thereof engages head 21 of adjustable stop 18, spring 52 will maintain stem 16 in engagement with said head and plunger 15 against movement until stop 53 constituting the top of said body has been lowered sufficiently to engage the top of plunger 15. During the descent of body 13 relative to plunger 15 as just described, pawl 41, which is pivoted on pin 47 carried by plunger 15, by reason of its engagement with a tooth of the right hand row of teeth 28, will maintain measuring leg 30 against movement relative to plunger 15. With plunger 15 and measuring leg 30 thus maintained against movement, pawl 40, which is pivoted on pin 42 carried by body 13, will be ratcheted over one tooth of the left hand row of teeth 28 as said body descends until the top 53 thereof engages the top of plunger 15.

Upon the top of body 13 engaging plunger 15, the body, plunger and measuring leg 30 constituting the measuring arm 1, as a unit, then descends until it assumes the position in which it is shown in Fig. 1 of the drawing.

Upon measuring arm 1 reaching the position just described, surface 34 of contact foot 31 will occupy, relative to measuring element 11, substantially the same position it occupied prior to the shortening of springs 6 or as when the springs were new.

If springs 6 further shorten prior to the next load measuring operation occurring when the car is fully loaded, rack 27 and measuring leg 30, at the time of the subsequent load measuring operation, will be ratcheted one tooth with respect to body 13 to thereby compensate for said shortening of said springs in the same manner as above described.

From the above description it will be seen that as springs 6 shorten while in service, the measuring arm 1 will operate when a load measuring operation is effected on a fully loaded car to compensate for said shortening so that the load compensating valve device 7 will be properly adjusted according to the load on the car.

It is desired to point out that the measuring arm 1 will operate to compensate for shortening of springs 6 when a load measuring operation is effected only on a fully loaded car and not when a load measuring operation is effected on a car less than fully loaded. When a car is less than fully loaded, the distance between surface 34 of contact foot 31 and the lowermost part of unsprung measuring element 11 is less than when the car is fully loaded, but the distance between the top of stem 16 and the bottom of adjustable stop 21 is the same as when the car is fully loaded. Therefore surface 34 will engage the lowermost part of unsprung measuring element 11 without the top of stem 16 engaging the bottom of head 21 of adjustable stop 18. Upon surface 34 thus engaging element 11 further counter-clockwise rocking of crank arm 9 and upward movement of measuring arm 1 is prevented whereupon the load compensating valve device 7 will be conditioned to provide the proper braking force for a partly loaded car in a manner fully explained in the hereinbefore mentioned copending application. The engagement of surface 34 of contact foot 31 with element 11 when the car is less than fully loaded, thus prevents engagement between stem 16 and adjustable stop 18 and consequential ratcheting of measuring leg 30 with respect to body 13 as has been explained in connection with a load measuring operation on a fully loaded car. It is evident therefore, that load measuring operations occurring, while the car is less than fully loaded, are without effect on the distance between surface 34 of contact foot 31 and the lowermost part of upsprung measuring element 11, which distance is effected by shortening of springs 6.

In the manner above described, the position of rack 27 within the body 13 may continue to be changed as the springs 6 continue to become shorter until pawls 40 and 41 have ratcheted over the total number of teeth on rack 27 at which time slot 37 will be flush with the bottom surface of cap 36 this being an indication to an observer that the measuring arm 1 is no longer effective to compensate for shortening of the springs 6 and requires resetting.

In order to reset the arm 1, the arm 30 will be manually moved into body 13 to permit the adjacent ends of pawls 40, 41 to ratchet over the lowest teeth 28, unless said pawls have already done so, whereupon the pawls 40 and 41 will be rocked by springs 43 and 48, respectively, from the position in which they are shown in Fig. 2 of the drawing to a position in which the force of each of the two springs acting on each of said pawls will be equal and in which latter position the respective right and left hand ends of said pawls will be disposed in engagement with a surface 54 formed on the lower end of rack 27 beneath the teeth 28. With pawls 40 and 41 thus disengaged from the teeth 28 and the ends thereof engaging surface 54, measuring leg 30 may be reset.

To reset measuring leg 30, said leg may be grasped with the hand exteriorly of body 13, and pulled in a downward direction. Downward movement of leg 30, as just described, causes pawls 40 and 41 to be rocked in clockwise and counter-clockwise directions respectively against the tension of springs 44 and 49 respectively, until the right hand end of pawl 40, and the left hand end of pawl 41 are moved out of engagement with surface 54 and to a position in which said ends will permit rack 27 to be moved downward until a surface 55 on said rack is below said ends, whereupon the tension of springs 44, 45, 48 and 49 will equalize and throw the pointed ends of pawls 40 and 41 back into the path of movement of the rack teeth.

To continue the resetting operation, measuring leg 30 now may be pushed upward by hand against the force of spring 39 until pawls 40 and 41 engage the respective uppermost teeth of the left and right hand rows of teeth 28 on rack 27. Pawls 40 and 41 will now occupy the position in which they are shown in Fig. 2 of the drawing.

After the measuring arm 30 has been reset as just described, said arm will occupy the same position relative to body 13 as it occupied prior to the shortening of springs 6. It should be noted however, if the device is being reset to compensate for further deformation of the car springs 6 that the distance between surface 34 of contact foot 31 and the lowermost part of measuring element 11 is not the same as it was prior to the initial shortening of springs 6, since the shortening of springs 6 permitted center sill 5 and measuring arm 1 carried thereby to assume a vertical position closer to truck frame 12 than permitted when said springs were new. Therefore, with the car fully loaded and with measuring leg 30 reset to occupy the same position relative to body 13 as it occupied prior to the shortening of springs 6, surface 34 of contact foot 31 will be disposed in a position further below measuring element 11 than the position in which it was disposed when springs 6 were new. As is explained in the hereinbefore copending application, the load compensating valve device 7 provides a braking force on the car in accordance with the distance between surface 34 of contact foot 31 and the lowermost part of unsprung measuring element 11. For this reason it is therefore necessary to readjust contact foot 31 with respect to upper threaded portion 29 until the distance between surface 34 and the lowermost part of measuring element 11 is the same for any load as it was prior to the shortening of springs 6.

To effect such readjustment, the bolts 32 are loosened and contact foot 31 moved upward with respect to upper threaded portion 29 and measuring element 11 until the desired distance between surface 34 of said foot and the lowermost part of said measuring element is obtained, at which time said bolts are tightened to rigidly secure said foot to said threaded portion. With contact foot 31 thus readjusted with respect to upper threaded portion 29, measuring arm 1 is conditioned to compensate, upon subsequent load measuring operations occurring on a fully loaded car, for further shortening of springs 6 in the same manner as above described.

The measuring arm 1 may be so designed as to compensate for either full or only partial change in the deflection characteristic of the springs 6. If designed to compensate for only partial change in the deflection characteristic then it will be necessary to reset the leg 30 relative to body 15 back to its original position as above described and also by means of bolts 32 readjust the foot 31 relative to threaded portion 29 and measuring element 11 to provide the same distance between surface 34 and measuring element 11 as existed at the beginning when the springs 6 were new, whereupon the measuring arm 1 will operate the same as above described to compensate for further change in deflection of springs 6.

If however, the design of the measuring arm is such as to compensate for full permissible change in deflection characteristic of the car springs 6, then upon said springs being replaced by new springs it will be necessary to reset the arm and readjust the foot 34 to the new springs in a manner which will be evident from the above remarks.

*Summary*

It will now be seen that I have provided a load measuring apparatus for use with load compensating fluid pressure brake equipment on railway cars, embodying means for automatically compensating for change in the deflection characteristics of truck springs so as to provide substantially the same adjustment of the compensating brake apparatus for any load on the car throughout the life of said springs, as provided when the springs are new.

Having now described my invention, what I claim as new and desire to secure by Letters Patent, is:

1. A measuring mechanism for a load compensating brake equipment for a vehicle having an unsprung part, a load carrying sprung part, and spring means resting on said unsprung part and supporting said sprung part, said measuring mechanism comprising a fixed measuring stop on said unsprung part, a measuring arm rockably mounted on said sprung part, and power means for actuating said arm into engagement with said stop, said arm comprising a casing operatively connected to said power means, an engaging arm for engagement with said stop, and pawl and ratchet mechanism automatically operative by said power means to adjust said arm relative to said casing upon a reduction in the height of said spring means incident to a change in deflection of said spring means for any chosen load on said sprung part.

2. A measuring mechanism for a load compensating brake equipment for a vehicle having a sprung part, an unsprung part and springs resting on said unsprung part and supporting said sprung part, said mechanism comprising a fixed stop on the sprung part and a fixed stop on the unsprung part, a measuring arm carried by said sprung part and comprising a casing, a leg for movement by said casing into engagement with said stop on said unsprung part, a pawl and ratchet mechanism connecting said leg to said casing, and a member associated with said casing disposed from said stop on said sprung part a distance equal to the distance that said leg is disposed from said stop on said unsprung part at the time the vehicle is fully loaded and said springs are new and operative, upon settling of said springs, into engagement with the stop on said sprung part prior to engagement of said leg with said stop on said unsprung part to operate said mechanism to ratchet said leg relative to said casing a certain chosen distance, and means for moving said casing, said leg and said member relative to said stops.

3. A measuring mechanism for a load compensating brake equipment for a vehicle having a sprung part, an unsprung part and spring means resting on said unsprung part and supporting said sprung part, said mechanism comprising a fixed stop on said sprung part and a fixed stop on said unsprung part, a measuring arm comprising two movable members, one of which is disposed the same distance from one of said stops as the other is disposed from the other of said stops only at the time the vehicle is fully loaded and said spring means are new, means operative to move said one and other members into engagement with, respectively, said one and other stops, and means operative upon engagement of one of said members with its stop prior to engagement of the other of said members with its stop to move said other member a chosen distance in the direction of its respective stop.

4. A measuring mechanism for a load compensating brake equipment for a vehicle having a sprung part, an unsprung part and spring means resting on said unsprung part and supporting said sprung part, said mechanism comprising a fixed stop on each of said sprung and unsprung parts, a measuring arm having an operative position and an inoperative position and comprising a first member which in the inoperative position of said arm is disposed from said stop on said unsprung part a distance that varies according to the load on the vehicle and the compressed height of said spring means, a second member connected to said first member and disposed, in the inoperative position of said arm, from said stop on said sprung member a distance equal to the distance said first member is disposed from said stop on said unsprung member at the time the vehicle is fully loaded and said spring means are new, means operative to move each of said members in the direction of its respective stop, and means operative in case of an increase in said first mentioned distance only when the car is fully loaded to move said first member relative to said stop on said unsprung member a chosen distance to compensate for said increase in the first mentioned distance.

5. A measuring mechanism for a load compensating brake equipment for a vehicle having a sprung part, an unsprung part and spring means resting on said unsprung part and supporting said sprung part, said mechanism comrising a fixed stop on each of said parts, a measuring arm and power means for moving said arm in the direction of said stops, said arm comprising a first movable member disposed for engaging the stop on said unsprung part and having a ratchet toothed segment, a pawl and ratchet mechanism effective upon each operation thereof to ratchet said first member in a direction toward its respective stop a distance equal to the distance between two adjacent ratchet teeth, a second movable member disposed in a position to engage said stop on said sprung part only when the vehicle is fully loaded and effective upon engagement with the last named stop prior to the engagement of said first member with its respective stop to operate said mechanism, and spring means for urging said pawl and ratchet mechanism into locking engagement with the toothed segment of the first mentioned movable member.

6. A measuring arm for a load compensating brake equipment comprising a hollow casing having a stop at each end, a member slidably disposed in said casing and having a bore therein, an engaging leg slidably disposed in said bore and having formed on a portion thereof a series of ratchet teeth, a pawl carried by said member for engaging said teeth, a first spring means carried by said member and operable to urge said pawl in a direction to engage one face of said ratchet teeth, a second spring means carried by said member and operable to urge said pawl in a direction to engage the other face of said teeth, means operable by an external force for ratcheting said pawl, one tooth each time said means is operated, and a third spring means disposed between one of said stops and said member to urge said member in the direction of the other of said stops.

7. A measuring mechanism for a load compensating brake equipment for a vehicle having an unsprung part, a load carrying sprung part, and spring means resting on said unsprung part and supporting said sprung part, a lever rockably mounted at one end on said sprung part, a measuring arm rockably mounted at one end on the opposite end of said lever and comprising a casing, a movable engaging leg for engaging an undersurface of said unsprung part, a ratcheting means for locking said engaging leg against movement relative to said measuring arm, and means operable in one direction to ratchet said leg relative to said casing, spring means operable to move said ratcheting means in an opposite direction, power means for actuating said lever, and means for effecting operation of said ratcheting means upon said power means rocking said lever through greater than a chosen angle, said greater angle being a function of a change in the "pick up" characteristic of said first mentioned spring means.

8. A measuring mechanism for a load compensating brake equipment for a vehicle having an unsprung part, a load carrying sprung part, a stop on each of said parts and spring means resting on said unsprung part and supporting said sprung part, said mechanism comprising a lever rockably mounted at one end on said sprung part, power means for rocking said lever, a measuring arm rockably mounted at one end on the opposite end of said lever and comprising an engaging leg having a hook for engaging the undersurface of said stop on said unsprung part, a ratcheting means connected to said leg, and a plunger mechanism operative by said power means to engage said stop on said sprung part simultaneously with the engagement of said stop on said unsprung part by said engaging leg and operative by said power means upon engagement with said stop on said sprung part prior to the engagement of said stop on said unsprung part by said engaging leg to operate said ratcheting means to ratchet said leg relative to said plunger.

9. A measuring mechanism for a load compensating brake equipment for a railway freight car having an unsprung truck member, a plurality of truck springs resting on said truck member, a sprung load carrying member supported by said springs, a first stop associated with said truck member and a second stop associated with said sprung member, a lever rockably mounted at one end on said sprung member, power means mounted on said sprung member and operatively connected to said lever for effecting rocking thereof, and a measuring arm rockably mounted at one end on the opposite end of said lever, said measuring arm comprising two movable elements so disposed that upon the car being fully loaded, one of said elements will be disposed substantially the same distance from said first stop that the other element is disposed from said second stop, and means operative by said power means in case of an increase in the distance between said one element and its respective stop to adjust said one element relative to said last mentioned stop to reduce such distance.

10. A measuring mechanism for a load compensating brake equipment for a vehicle having an unsprung part, a load carrying sprung part, spring means resting on said unsprung part and supporting said sprung part, and a stop member on each of said parts, said mechanism comprising a lever rockably mounted at one end on said sprung part, power means for rocking said lever, and a measuring arm rockably mounted at one end on the opposite end of said lever and comprising a hollow casing having a stop at each end, a plunger slidably mounted in said casing between said stops, an engaging leg mounted to slide in said plunger parallel to the direction of its movement and extending exteriorly from said casing and having at its outer end a hook for engagement with said unsprung part and having within said casing ratchet teeth, a first pawl pivotally carried by said plunger, spring means anchored on said plunger for biasing said first pawl into engagement with certain of said teeth, a second pawl pivotally carried by said casing, second spring means anchored on said body and biasing said second pawl into engagement with other of said teeth, means operative to move said plunger in one direction to cause said first pawl to ratchet over one of said teeth, and structure operative subsequent to the operation of the last named means to move said plunger in the opposite direction to cause said second pawl to ratchet over one of said teeth.

11. In combination, two stops, a casing disposed between said stops, means for moving said casing in the direction of either one of said stops, a plunger slidably mounted in said casing, a stem formed integral with said plunger and extending a chosen distance outside of said casing to engage one of said stops upon said casing being moved in the direction thereof, an engaging leg slidably mounted in said plunger axially thereof and extending to the exterior of said casing in a direction opposite to the direction of said stem, said leg having at its outer end a hook for engaging the other of said stops upon movement of said casing in said one direction and having at the opposite end ratchet teeth the pitch of which is equal to said chosen distance, two pawls one carried by said casing for moving said leg with said casing and relative to said plunger for ratcheting the other pawl one tooth upon movement of said casing in one direction relative to said plunger, and said other pawl carried by said plunger for holding said leg against movement relative to said plunger upon movement of said casing in the opposite direction relative to said plunger for ratcheting the one pawl one tooth, first spring means carried by said casing and operative to bias said one pawl into engagement with certain of said teeth, and second spring means carried by said plunger and operative to bias said other pawl into engagement with other of said teeth.

DUANE M. HART.

REFERENCES CITED

The following references are of record in the file of this patent:

UNITED STATES PATENTS

| Number | Name | Date |
| --- | --- | --- |
| 1,571,506 | Bozic | Feb. 2, 1926 |
| 2,355,747 | Oliver | Aug. 15, 1944 |
| 2,407,870 | Cook | Sept. 17, 1946 |